(12) United States Patent
Christ

(10) Patent No.: US 6,529,798 B1
(45) Date of Patent: Mar. 4, 2003

(54) PROCESS FOR HANDLING ARTICLES IN THE MAIL ORDER BUSINESS

(76) Inventor: Ferdinand Christ, Johann-Sebastian-Bach-Ring 21, D-91575 Windsbach (DE)

( * ) Notice: Subject to any disclaimer, the term of this patent is extended or adjusted under 35 U.S.C. 154(b) by 0 days.

(21) Appl. No.: 09/531,185

(22) Filed: Mar. 21, 2000

(51) Int. Cl.⁷ ................................................. G06F 7/00
(52) U.S. Cl. ...................... 700/223; 700/224; 700/216
(58) Field of Search ................................ 700/223, 224, 700/216

(56) References Cited

U.S. PATENT DOCUMENTS

| | | | |
|---|---|---|---|
| 5,434,394 A | * | 7/1995 | Roach et al. ................ 235/375 |
| 5,733,098 A | * | 3/1998 | Lyon et al. .................. 414/786 |
| 5,794,789 A | * | 8/1998 | Payson et al. ............... 209/549 |
| 6,073,060 A | * | 6/2000 | Robinson ..................... 700/223 |
| 6,208,908 B1 | * | 3/2001 | Boyd et al. ................. 700/223 |

FOREIGN PATENT DOCUMENTS

| | | | |
|---|---|---|---|
| DE | 9104290 | 7/1991 | |
| DE | 9407577 | 8/1994 | |
| DE | 4332315 | 3/1995 | |
| DE | 29720655 | 2/1998 | |
| EP | 183074 | 6/1986 | |
| EP | 209750 | 1/1987 | |
| EP | 431823 | 6/1991 | |
| EP | 0431823 A1 * | 6/1991 | ............ B65G/1/37 |
| EP | 615926 | 9/1994 | |

* cited by examiner

Primary Examiner—Donald P. Walsh
Assistant Examiner—Michael E Butler
(74) Attorney, Agent, or Firm—Browdy and Neimark, P.L.L.C.

(57) ABSTRACT

A process for handling articles in the mail order business, particularly soft-good articles and hard-good articles, whereby each article is chaotically entered into a receptacle that holds only one article and this receptacle is incorporated into a commissioning device that has a plurality of receptacles, during which process the identifier of the receptacles and the identifier of the article are married to one another by a computer unit.

18 Claims, 1 Drawing Sheet

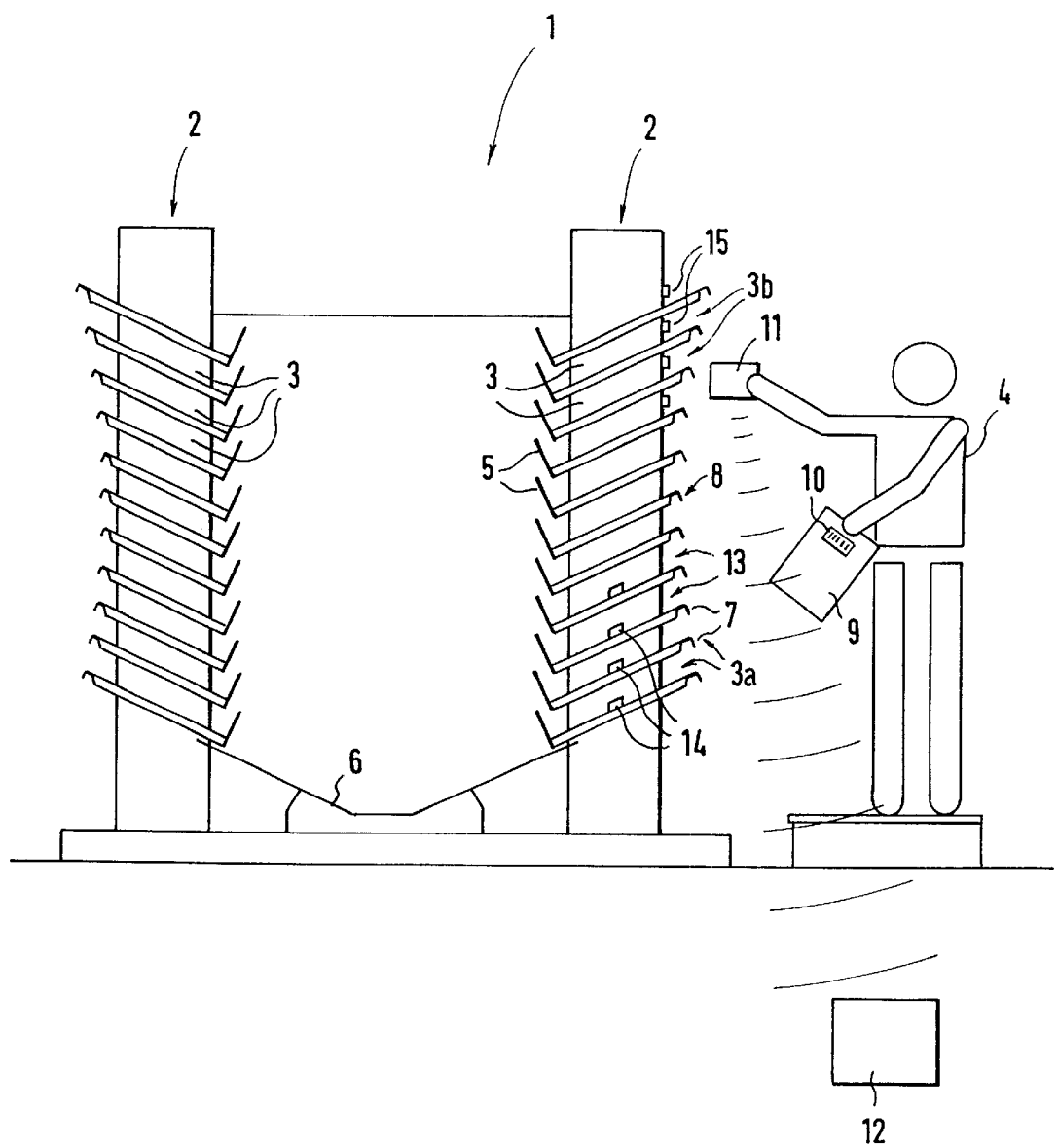

PROCESS FOR HANDLING ARTICLES IN THE MAIL ORDER BUSINESS

The present invention relates to a process for handling articles, particularly soft-good articles or hard-good articles, in the mail order business.

In the mail order business, a problem is posed by the fact that ordered items can always be returned by the customer. These articles, which are referred to as returns, must be made available for remailing, as they are generally articles that can be sent out again, i.e., they are not yet damaged or the like. However, this results in a series of problems, particularly due to the considerable quantities of returns, which can amount to tens of thousands of articles per day. Remailing is generally performed by restocking the returns to their original storage shelves, which can be done only manually and is very time-consuming. In view of the large number of articles this is hardly a practical system. It is also known to create a separate returns warehouse. Where the returns, which are recorded according to their type, are deposited and commissioned when they are needed. A process of this type is known from German patent document DE 43 32 315 C2. Within the framework of this process several returns are sorted into a storage container and transported to a returns warehouse, where they are picked manually as required. While this process has proven useful in practice, it is nevertheless relatively slow with respect to its duration from the time a return is received to the time it can be remailed, because a large number of handling steps must be performed.

However, for an economic and efficient commissioning and mailing of the considerable number of articles, a process that is both simple and permits a high throughput is also needed for the initial mailing of new articles.

The present invention is based at least on the objective of presenting a process of the above type that permits a swift handling of the articles, particularly remailing of received returns, and is, also a simple process.

To meet this objective, a process of the above type is designed such that, in accordance with the invention, each article is chaotically entered into a receptacle that holds only one article and is part of a commissioning device that comprises a plurality of receptacles. During this process the identifier of the receptacle and the identifier of the article are married to one another by a computer unit.

The process according to the invention advantageously places each individual article, be it a new article or a return, into a separate receptacle of a commissioning device, in such a way that the distribution across all receptacles is chaotic, i.e., any random article may be placed into any random empty receptacle. The advantageous marrying of the receptacle identifier to the article identifier permits a complete transparency of the stocking condition of the commissioning device, i.e., it is known at all times where which article is located. If a matching order is received, the respective article can easily be removed and removal is made very simple by the fact that each receptacle does not hold more than one article. Commissioning or recommissioning can, theoretically, take place as soon as the marriage of the identifiers has occurred. The inventive process is thus significantly faster than the known processes with respect to a possible mailing, particularly of returns. When commissioning is required, the article can be automatically dispensed from the receptacle, i.e., suitable automatically operated dispensing devices, such as flaps, are provided on the receptacle, which open when the article is needed so that the article can drop from the receptacle. In addition to or in lieu of this system, it is also possible to remove articles manually for commissioning purposes, in which case the given receptacle in which the required article is located is indicated by means of suitable visual indicators, e.g., in the form of a light-emitting diode.

To ensure that an order for a certain article is filled primarily by commissioning an article that may be present, so that the returns storage is emptied first, the inventive process may be such that when a commissioning order for an article is received, a check is first performed to determine whether the article is available in a commissioning device containing the returns, and if the return is present, this article is commissioned. Only if the requested article does not exist as a return is commissioning performed from the main or distribution warehouse, depending on how the overall warehouse is structured. In principle, however, the return is to be commissioned first. The returns are given priority in order to guarantee the swiftest possible cyclical emptying of the commissioning device.

According to the invention, the articles or returns may be entered into the receptacles manually and/or automatically. If stocking is done manually, the articles are simply placed, inserted or thrown into the receptacles, depending on how the commissioning device is structured and on the type of articles. To record the relevant identifiers, the process may be such that, if stocking is done manually, the identifiers of the respective receptacle and article are read-in or entered by means of an electronic reading or entry device, particularly a scanner, and/or entered by means of an input device, particularly a keyboard. This poses no problem, particularly if a bar code scanner is used, as the person processing the returns merely needs to scan the respective label on the receptacle and the label on the article once with the scanner, after which the data are already married to one another by the computer unit. It is advantageous if a radio scanner is used for this purpose, which may optionally have a keyboard to additionally permit manual entries. In lieu of the described "manual reading-in" of the receptacle identifier by means of the reading or entry device, the process may alternatively provide for an automatic entry of the receptacle identifier at the time the receptacle is stocked, e.g., by means of light barriers or the like that are actuated when the article is entered into the receptacle. In this case this leaves only the article identifier to be recorded. If stocking of the receptacles is performed automatically, according to the invention only the identifier of the article needs to be read-in with the aid of an electronic reading or entry device, particularly a scanner, and the receptacle identifier is entered automatically at the time the receptacle is stocked. The identifier may be a bar code. Alternatively—or in combination—a transponder may be used as the respective identifier or as means for transmitting the respective identifier, in such a way that the identifier is encoded and readable in the form of a magnetic field. The transponder may be attached on both, the article or its packaging material and the receptacle.

In an advantageous improvement of the invention, the empty receptacles that are available for stocking may be indicated by means of a visual indicator, which is advantageous particularly for the manual stocking process, since the operator immediately knows which receptacle is still available for stocking. However, also if stocking is performed automatically the indication of empty receptacles is advantageous, as it provides an indication whether there are any receptacle capacities left.

According to the invention, the operation of the commissioning device may furthermore be specifically designed so that it can be manipulated in such a way that one or more stocked articles are dispensed automatically in dependence upon one or more commissioning parameters, or that a visual indication is given of the articles to be picked. According to this embodiment of the invention it is, therefore, possible to specifically manipulate the commissioning operation, and thus the handling of articles, with computer entries of the specific commissioning parameter (s). This is required, for example, to be able to pick articles of which multiples exist in the commissioning device, or which have already been in the device for a certain period of time, in order to forward these to the main or distribution warehouse, since these are articles that are not ordered and commissioned as often and unnecessarily take up space in the commissioning device. Besides these commissioning parameters (quantities of certain articles, lengths of time that certain returns remain stocked), commissioning may, for example, also take place according to certain categories of receptacle numbers, matching commissioning device modules or receptacle lines. If these articles are returns, the respective "parent shelf" in the main or distribution warehouse is advantageously indicated, after commissioning, on an included printout, to be able to restock any given returns there. The "parent shelf", too, may be a corresponding commissioning parameter, as, for all practical purposes, only those returns can be restocked in the main or distribution warehouse for which a parent shelf exists there. Furthermore, the process may be performed in a batch cycle operation.

According to the invention, after commissioning has taken place, the respective article can be labeled and/or packaged and optionally prepared for mailing, depending on the order. Alternatively, it may also be combined with other articles to complete a group of articles, for example if an order includes additional articles.

In addition to the inventive process, the invention furthermore relates to a commissioning device that can be used within the framework of the above described process. This commissioning device has a plurality of receptacles that are arranged vertically or horizontally and it is characterized in that a plurality of receptacles are provided, each of which is designed to hold only one article, and that means are provided whereby an identifier that is assigned to each receptacle and an identifier that is assigned to each article can be read-in and or sent to a connected computer unit when a receptacle is stocked with an article.

These means may comprise a device for reading or recording the identifier of the receptacle and/or the identifier of the article and/or for manual input of the respective identifier, for which purpose a manually operated radio reading or entry device is advantageously used, preferably a radio scanner, and/or a keyboard, which is preferably integrated into the scanner. The identifier can be issued by means of a transponder in such a way that the reading or entry device is designed to read these special identifiers. In addition, a bar code may also be used. Additionally or alternatively, these means may be designed to automatically enter the identifier into the computer unit or send the identifier to the computer unit when the receptacle is stocked. For which purpose each receptacle advantageously has an assigned sensor element, e.g., in the form of a light barrier, which issues a sensor signal that represents the identifier or causes the identifier to be issued when the receptacle is stocked. This means that if the sensor element is advantageously actuated, a signal is issued, which either represents the receptacle identifier itself or actuates issuance of the identifier, for example by means of a downstream processor unit.

According to the invention, the commissioning device may be designed for manual and/or automatic stocking of the articles. For manual stocking in particular, and especially for the manual entry of the receptacle identifier by means of a scanner, it has proven advantageous if the insertion openings and/or the sections showing the identifier of the vertically arranged receptacles are arranged, at least in part, offset in a horizontal direction. An arrangement of the insertion openings and sections along a curved line has proven advantageous with respect to the body movement of the operator.

The commissioning device may furthermore be designed for manual and/or automatic removal or dispensing of the articles. Lastly, visual indicators, e.g., in the form of light-emitting diodes, may be provided to indicate the stocking status of each receptacle.

To increase the capacity of the commissioning device, the commissioning device may, according to the invention, incorporate two rows of receptacles that are arranged side-by-side or on top of one another, between which a conveyor belt or the like is provided onto which the articles can be deposited automatically. This conveyor belt is advantageously designed as a troughed belt conveyor.

Further advantages, characteristics and details of the invention are illustrated by the embodiment that is described below and by the drawing.

The drawing shows, in the form of a schematic diagram, a commissioning device 1 according to the invention. This commissioning device comprises two rows 2, each of which incorporates a plurality of receptacles 3 that are arranged on top of one another and side by side. Into each receptacle 3, an article—in this case a return—can be placed, preferably soft-good articles, for example articles of clothing or the like, that are sealed in plastic. The illustrated commissioning device is designed for manual stocking, i.e., the operator 4 manually places the given return into the given, slanted receptacle. At the lower end of each receptacle there is an automatic dispensing device 5, in the shown example in the form of drop-down sheet metal flaps. To dispense the given stocked return, the device 5 is actuated by a computer unit, so that the return can fall onto the conveyor belt 6—in the shown example a troughed belt conveyor—that is provided between the two rows.

In order to know which return is located in which receptacle, which is required for a targeted commissioning of these articles, sections 7 are provided on each receptacle, and each of these sections 7 has an affixed identifier 8. An identifier 10 is also affixed on each return 9. These identifiers 8, 10 are preferably bar codes, which can be read by simple scanning with a reading device in the form of a radio scanner 11. To enter the return 9, the radio scanner 11 is used to first read the identifier 10 of the return 9 and then the identifier 8 of the receptacle 3 into which the return is placed. The identifiers are transmitted to a computer unit 12, which marries these identifiers to one another, i.e., it assigns them to one another. It is thus apparent which return is stocked in which receptacle. If only[1] one order is received for this article, a query is first performed to check whether this return exists in the commissioning device 1. If this is the case, the specific receptacle, or its dispensing device, is actuated directly by the computer unit 12, so that the desired return is dispensed. A transponder may be used in lieu of a bar code.

[1]Translator's note; it appears that there may be a typographical error in the German-language document and the intended word may have been "nun" (now) instead of "nur" (only). In this case the English sentence would read: "If an order is now received for this article, a query is first performed to check whether this return exists in the commissioning device 1."

As the figure further shows, the openings 13 of the receptacles 3, and therefore also the sections 7, are arranged offset from one another so that a curved line results. This arrangement is advantageous from an ergonomic perspective. It makes it easier to enter the given returns and also facilitates scanning of the receptacle identifier, as this curved arrangement substantially corresponds to the range of motion of the radio scanner 11. It is also possible, of course, to have a straight arrangement, for example if the overall height is low.

For the sake of completeness, to illustrate an alternative embodiment of a device, two sensor elements 14 are shown in the area of the receptacles 3a, which may, for instance, be light barriers. These sensor elements also communicate with the computer unit 12 and automatically supply to the computer unit 12 the receptacle identifier when the receptacles 3a are stocked with a return, i.e., the operator no longer needs to manually read-in the receptacle identifier with the radio scanner 11. The drawing furthermore shows visual indicators 15 in the area of the receptacles 3b, e.g, in the form of light-emitting diodes, which indicate the stocking status of a receptacle. Of course the stocking status of the receptacle is also recorded by mans of a sensor element, which is not shown in the drawing. This may be done, for example, with the sensor elements 14, whose signal then also activates the visual indicator unit 15. This shows the operator 4 at all times where available, empty receptacles are located.

What is claimed is:

1. A method for handling articles in a mail order business, comprising:

providing a commissioning device comprising a plurality of receptacles, each of the receptacles being adapted to hold any one of the articles;

chaotically placing one of the articles into one of the plurality of receptacles;

marrying a first identifier, associated with the article, with a second identifier, associated with the one of the receptacles which holds the article therein, and if a commissioning order is received for an article, first checking the returns for the availability of the article to be commissioned, and if a matching return is available first commissioning the article and dispensing the commissioned article from a receptacle containing the commissioned article.

2. The method according to claim 1, comprising indicating with a visual indicator the one of the receptacles wherein a commissioned article is contained, and manually retrieving the commissioned article.

3. The method according to claim 1, wherein that the articles include returns.

4. The method according to claim 1, comprising placing the articles into the receptacles automatically.

5. The method according to claim 1, comprising placing the articles into the receptacles manually, and entering the first identifier and the second identifier of the article via an electronic reading/entry device.

6. The method according to claim 5, wherein the reading/entry device comprises a scanner.

7. The method according to claim 5, wherein the reading/entry device comprises a keyboard.

8. The method according to claim 7, comprising using a radio scanner or a radio entry device with a keyboard.

9. The method according to claim 1, comprising placing the articles into the receptacles manually, entering the first identifier and the second identifier of the article via an electronic reading/entry device, and automatically entering the second identifier of the receptacle when the receptacle is filled.

10. The method according to claim 1, comprising automatically entering both the first identifier and the second identifier.

11. The method according to claim 1, comprising reading in at least one of the first identifier and the second identifier via a bar code.

12. The method according to claim 1, comprising using a transponder as the first identifier or the second identifier.

13. The method according to claim 1, comprising using a transponder as a means for transmitting the first identifier or the second identifier.

14. The method according to claim 1, comprising indicating with a visual indicator the an empty one of the receptacles.

15. The method according to claim 1, comprising operating the commissioning device in such a way that one or more of the stocked articles are dispensed automatically in dependence on one or a plurality of commissioning parameters, or that there is a visual indication of the articles to be picked.

16. The method according to claim 1, comprising a batch-cycle operation wherein the articles are dispensed or picked.

17. The method according to claim 1, comprising preparing an already-commissioned article by at least one of packaging, preparing for mailing, and assembling with other articles into a group of articles.

18. The method according to claim 1, wherein the articles include one of soft-good articles and hard-wood articles.

* * * * *